US008271265B2

(12) United States Patent
Kim

(10) Patent No.: US 8,271,265 B2
(45) Date of Patent: Sep. 18, 2012

(54) METHOD FOR SEARCHING FOR CHINESE CHARACTER USING TONE MARK AND SYSTEM FOR EXECUTING THE METHOD

(75) Inventor: Do Youn Kim, Seoul (KR)

(73) Assignee: NHN Corporation, Seongnam-si (KR)

( * ) Notice: Subject to any disclaimer, the term of this patent is extended or adjusted under 35 U.S.C. 154(b) by 1427 days.

(21) Appl. No.: 11/843,632

(22) Filed: Aug. 22, 2007

(65) Prior Publication Data

US 2008/0052064 A1 Feb. 28, 2008

(30) Foreign Application Priority Data

Aug. 25, 2006 (KR) ........................ 10-2006-0081281

(51) Int. Cl.
*G06F 17/28* (2006.01)
*G06F 17/20* (2006.01)
*G06F 17/27* (2006.01)
(52) U.S. Cl. ...................... 704/10; 704/4; 704/8; 704/9
(58) Field of Classification Search ................ 704/9, 10, 704/4, 8
See application file for complete search history.

(56) References Cited

U.S. PATENT DOCUMENTS

| 5,787,231 | A | * | 7/1998 | Johnson et al. ............... 704/260 |
| 5,832,478 | A | * | 11/1998 | George ................... 1/1 |
| 5,864,805 | A | * | 1/1999 | Chen et al. .................... 704/235 |
| 6,014,615 | A | * | 1/2000 | Chen ................ 704/3 |
| 6,073,146 | A |  | 6/2000 | Chen |
| 6,401,060 | B1 | * | 6/2002 | Critchlow et al. ............... 704/1 |
| 7,590,626 | B2 | * | 9/2009 | Li et al. .......................... 707/708 |
| 7,752,032 | B2 | * | 7/2010 | Izuha ............................... 704/7 |
| 2002/0152258 | A1 | * | 10/2002 | Zhou ............................ 709/201 |
| 2002/0180806 | A1 | * | 12/2002 | Zhang et al. .................. 345/816 |
| 2004/0004558 | A1 | * | 1/2004 | Fux ................................ 341/22 |
| 2005/0060138 | A1 | * | 3/2005 | Wang et al. ....................... 704/1 |
| 2005/0080612 | A1 | * | 4/2005 | Chai et al. .......................... 704/5 |

(Continued)

FOREIGN PATENT DOCUMENTS

CN 87107634 5/1988

(Continued)

OTHER PUBLICATIONS

Wan, Stephen, et al., "Automatic English-Chinese Name Transliteration for Development of Multilingual Resources", Proceedings of the 36th Annual Meeting of the Association for Computational Linguistics, Montreal Canada, © 1998, pp. 1352-1356.*

(Continued)

*Primary Examiner* — Douglas Godbold
*Assistant Examiner* — Edgar Guerra-Erazo
(74) *Attorney, Agent, or Firm* — H.C. Park & Associates, PLC

(57) ABSTRACT

A method for searching for a Chinese character using a tone mark and system for executing the method is provided. The method includes: receiving a search term from a user; verifying a type of said received search term based on at least a portion of said received search term wherein the type includes at least one phonetic Chinese language or at least one Chinese character; and providing a search result based, at least in part, upon the verified type in response to the user's search request wherein the search result include dictionary definition of at least one Chinese character associated with the received search term.

19 Claims, 10 Drawing Sheets

U.S. PATENT DOCUMENTS

| | | | |
|---|---|---|---|
| 2005/0209844 A1* | 9/2005 | Wu et al. | 704/2 |
| 2006/0048055 A1* | 3/2006 | Wu et al. | 715/535 |
| 2006/0106769 A1* | 5/2006 | Gibbs | 707/3 |
| 2006/0235677 A1* | 10/2006 | Chen et al. | 704/9 |
| 2006/0253427 A1* | 11/2006 | Wu et al. | 707/3 |
| 2007/0010992 A1* | 1/2007 | Hon et al. | 704/9 |
| 2007/0027671 A1* | 2/2007 | Kanawa | 704/4 |
| 2007/0106499 A1* | 5/2007 | Dahlgren et al. | 704/10 |
| 2008/0183673 A1* | 7/2008 | Gao et al. | 707/3 |
| 2009/0157383 A1* | 6/2009 | Cho et al. | 704/8 |

FOREIGN PATENT DOCUMENTS

| | | |
|---|---|---|
| CN | 1383517 | 12/2002 |
| JP | 63-118862 | 5/1988 |
| JP | 07-200600 | 8/1995 |
| JP | 08-185396 | 7/1996 |
| JP | 2001-014304 | 1/2001 |
| KR | 2005-0092999 A | 9/2005 |
| WO | WO 02/01312 | 1/2002 |

OTHER PUBLICATIONS

Kiyohara Humiyo, Online Chinese Dictionary "Kitajiro", Journal of Japan Association for East Asian Text Processing, pp. 140-143, Oct. 1, 2005.

News release, Feb. 24, 2006 English abstract.

* cited by examiner

FIG. 7
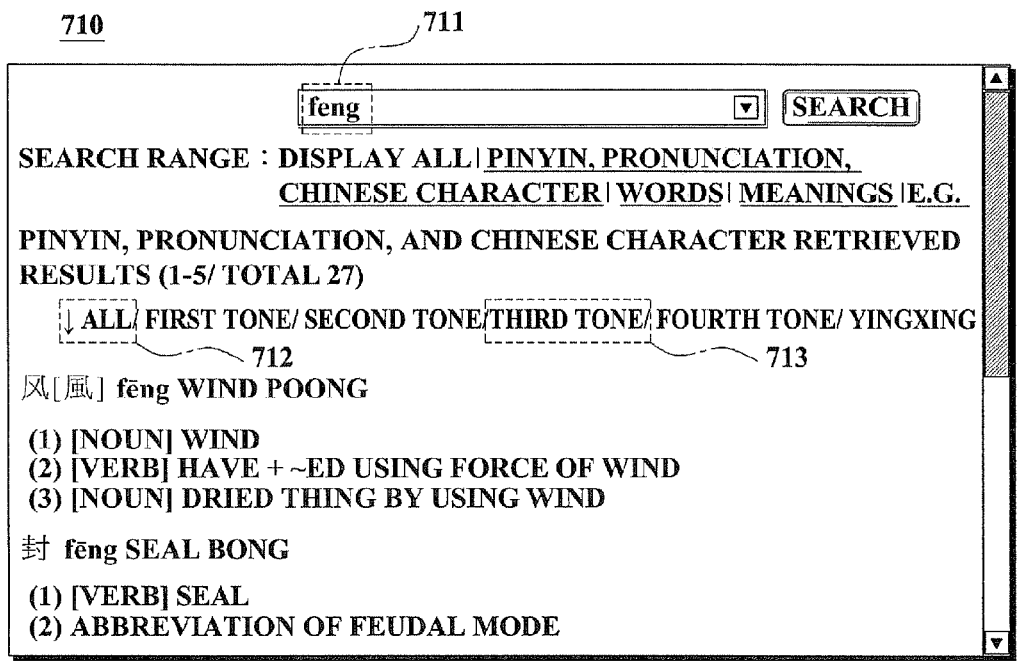
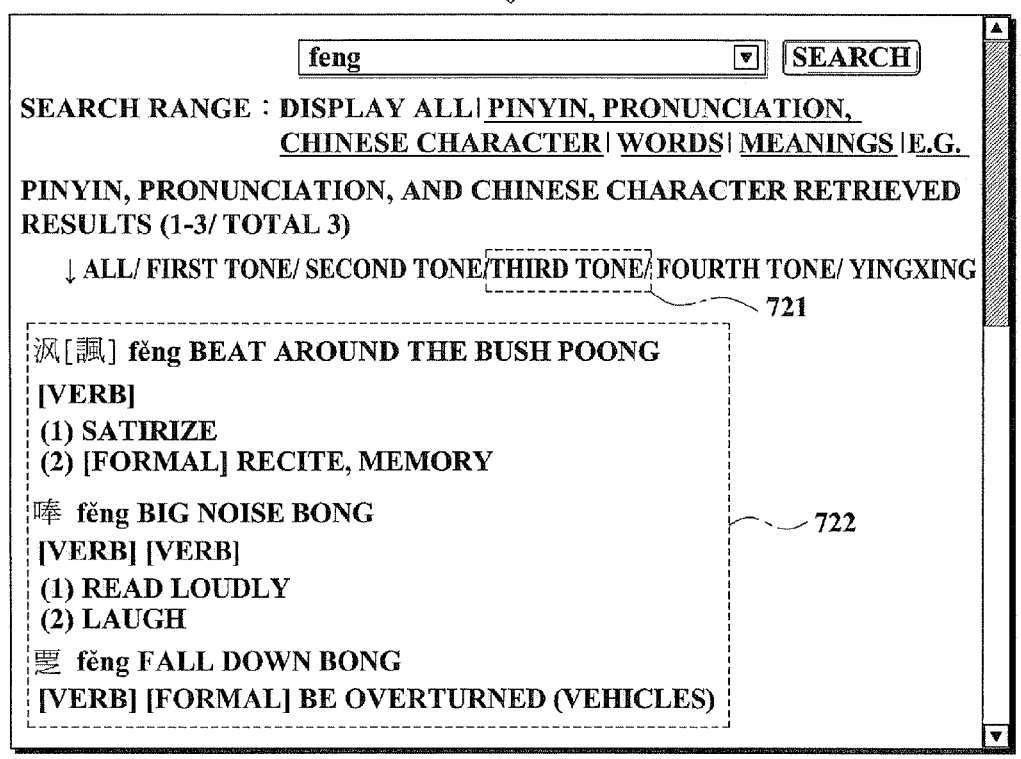

METHOD FOR SEARCHING FOR CHINESE CHARACTER USING TONE MARK AND SYSTEM FOR EXECUTING THE METHOD

CROSS-REFERENCE TO RELATED APPLICATION

This application claims the benefit of Korean Patent Application No. 10-2006-0081281, filed on Aug. 25, 2006, in the Korean Intellectual Property Office, the disclosure of which is incorporated herein by reference.

BACKGROUND OF THE INVENTION

1. Field of the Invention

The present invention relates to a method of searching for a Chinese character using a tone mark and a system using the method, more particularly, to a method for searching for a Chinese character for each tone mark by identifying a search word including tone marks, and for displaying a retrieved result for each tone mark, and a system for executing the method.

2. Description of Related Art

Tone marks are changes of a pitch level of speeches in case of continuous speech which correspond to syllables, and the tone marks are occasionally confused with an accent. Converse to the tone marks, the accent indicates that a high tone mark exists at a predetermined location in a word.

A language where meanings are distinguished by such differences of the tones are referred to as a tonal language. Chinese is representative of tonal languages, and Mandarin Chinese has four tones referred to as a first tone (-ma), a second tone ('ma), a third tone (ma), and a fourth tone (ma). Pinyin Romanization or Wade-Giles Romanization are usually used for Chinese Romanization.

In a Chinese dictionary using a conventional art, Chinese characters are directly entered, or Pinyin is entered while ignoring the tone marks. However, according to the conventional art, a required character is searched from all entered first, second, third, and fourth tones even when a user wants to search for a character of only the first tone, and retrieved result pages are classified into a plurality of pages since a great number of retrieved results for the required character exist, thus there is a problem in that, all characters that belong to the plurality of retrieved results pages are required to be searched through by the user.

FIG. 1 is a diagram illustrating an example of searching for a Pinyin character using Romanization in a Chinese dictionary. Specifically, FIG. 1 is the diagram illustrating a character corresponding to a third tone is searched for using a search word 111 'feng'.

A web page 110 displays a retrieved result page for the search word 111. Regarding the web page 110, a predetermined number of retrieved results may be disclosed when a great number of retrieved results exist, and remaining retrieved results may be disclosed to a user using a function allowing further display 112.

In this instance, it is required to move to another web page 120, that is, another search page, using the function for further display 112 in order to search for a character corresponding to the third tone since characters are displayed in an order from a first tone, a second tone, the third tone, and a fourth tone in the Chinese dictionary using the conventional art.

The web page 120 is a first page 121 of the retrieved result, and displays a part of an entire page, the entire page being verified to a last retrieved result using a scroll bar 122, with respect to a retrieved result which is not disclosed on a user's monitor all at once. In this instance, the user is required to move to a web page 130 to obtain the required retrieved result.

The web page 130 is a second page 131 with respect to the retrieved result, and the scroll bar 132 is used to search for required characters, remaining required characters are searched, among third tone characters, after having retrieved a first third tone character 133. In this instance, when a required character is not found in the third tone characters in the web page 130, the user is required to move to another page.

As described above, Pinyin search ignoring the tone signs has problems in that, all characters from a first through fourth tones are required to be verified even when a required search result is disclosed to on a web page, and the user is required to move to a plurality of retrieved result pages and to verify retrieved results in order to obtain the required search result.

BRIEF SUMMARY

The present invention provides a method for searching for a Chinese character using tone marks and a system using the method which can easily and quickly obtain a required search result since a numerical keyword is recognized as a tone mark of a Pinyin keyword being included in a search word when the search word with respect to the Chinese character is entered, and a retrieved result with respect to the tone mark is exclusively disclosed as the retrieved result for the Pinyin keyword.

The present invention also provides a method for searching for a Chinese character using tone marks and a system using the method which can easily and quickly obtain a required retrieved result since a retrieved result page for each tone mark is displayed along with a retrieved result of a Pinyin keyword included in the search word, with respect to a search word without a numerical keyword, and a link to a result page of each tone mark is additionally displayed along with the retrieved result of the Pinyin keyword.

The present invention also provides a method for searching for a Chinese character using tone marks and a system using the method which can verify a retrieved result for each tone mark using a numerical keyword and a link in searching for a Pinyin character of all tonal languages, including Chinese.

According to an embodiment of the present invention, there is provided a method for searching for a Chinese character including: receiving a search term from a user; verifying a type of the received search term based on at least a portion of the received search term wherein the type include at least one phonetic Chinese language and at least one other Chinese language; and providing a search result based, at least in part, upon the verified type in response to the user's search request wherein the search result include dictionary definition of at least one Chinese character associated with the received search term. The phonetic Chinese language includes Pinyin. Further, the phonetic Chinese language can be written in other languages, such as Korean. The step of providing a search result based, at least in part, upon the verified type in response to the user's search request comprises searching at least one Chinese character associated with a Korean syllable keyword where the verified type is a phonetic Chinese language written in Korean; and providing a search result including the searched Chinese character in response to the user's search request. The step may further comprises providing at least one link associated with the search result, the link being indicative of at least one tone mark wherein the link directs to searched Chinese character associated with the tone mark.

According to an aspect of the present invention, the step of searching for the individual character includes: searching for an individual Pinyin character based on Pinyin Romanization or Wade-Giles Romanization; searching for a single Korean syllable; and searching for a single Chinese character.

According to another aspect of the present invention, the step of verifying a type of the received search term based on at least a portion of the received search term comprises: extracting at least one keyword from the received search term; and analyzing the keyword to determine the type of the received search term.

According to still another aspect of the present invention, the step of providing a search result based, at least in part, upon the verified type in response to the user's search request comprises: identifying a numerical keyword as a tone mark of a Pinyin keyword where the received search term includes a combination of the Pinyin keyword and the numerical keyword; searching at least one Chinese character associated with the Pinyin keyword and the tone mark thereof; and providing a search result including the searched Chinese character in response to the user's search request.

According to another embodiment of the present invention, there is provided a method for searching for a character in a tonal language including: receiving a search term from a user; verifying a type of the received search term based on at least a portion of the received search term wherein the type include at least one phonetic Chinese language; searching at least one Chinese character associated with a Pinyin keyword and a tone mark thereof where the verified type is Pinyin; and providing a search result including the searched Chinese character in response to the user's search request.

According to still another embodiment of the present invention, there is provided a system for searching for a Chinese character including: an individual character search verification component configured to verify a type of said received search term based on at least a portion of said received search term wherein the type include at least one phonetic Chinese language and at least one Chinese character; and a retrieved result providing component configured to provide a search result based, at least in part, upon the verified type in response to the user's search request wherein the search result include dictionary definition of at least one Chinese character associated with the received search term. The system further comprises: a tone mark identification component configured to identify a numerical keyword as a tone mark of a Pinyin keyword where said received search term includes a combination of the Pinyin keyword and the numerical keyword; search component configured to search at least one Chinese character associated with said Pinyin keyword and said tone mark thereof, and a retrieved result providing component configured to provide a search result including said searched Chinese character in response to the user's search request.

According to still another embodiment of the present invention, there is provided a system for searching for a Chinese character including: an individual character search verification component configured to verify whether to search for an individual character of a search word being entered via a user terminal; and a retrieved result providing component configured to provide the user terminal with different retrieved results according to expressions of the search word, in the step of the searching for the individual character.

BRIEF DESCRIPTION OF THE DRAWINGS

The above and/or other aspects and advantages of the present invention will become apparent and more readily appreciated from the following detailed description, taken in conjunction with the accompanying drawings of which:

FIG. 7 is a diagram illustrating a retrieved result page which is generated with respect to a search word including Pinyin keyword;

DETAILED DESCRIPTION OF EMBODIMENTS

Figure 1:
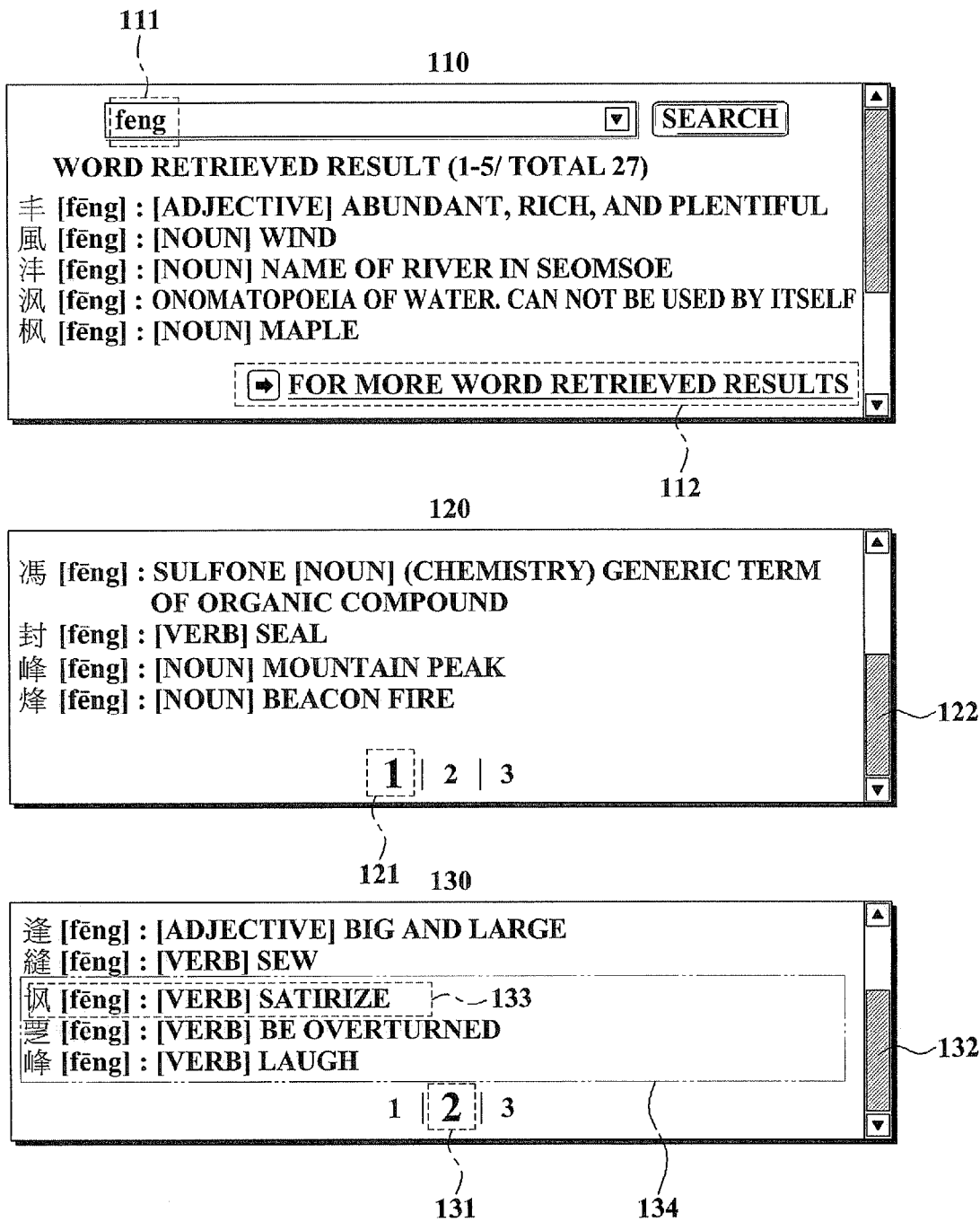
FIG. 1 is a diagram illustrating an example of searching for a Pinyin character using Romanization in a Chinese dictionary in a conventional art.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

Figure 2:
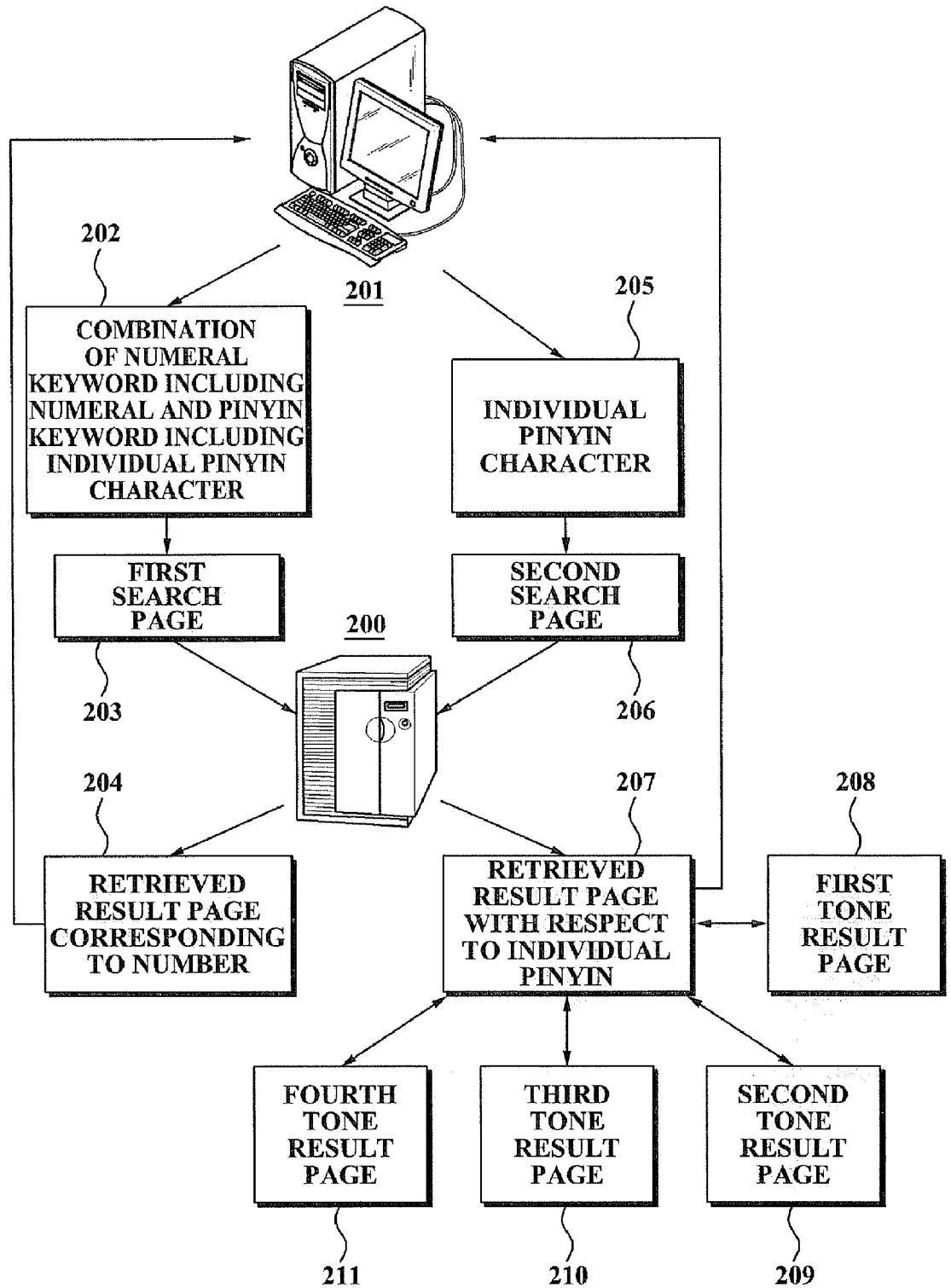
FIG. 2 is a diagram illustrating a system for searching for a Chinese character according to a first embodiment of the present invention.

FIG. 2 is a diagram illustrating a system 200 for searching for a Chinese character according to a first embodiment of the present invention.

The system 200 of searching for a Chinese character receives a search word from a user terminal 201, extracts a keyword from the search word, and provides the user terminal 201 with a retrieved result using the keyword.

When the search word is a combination 202 of a numerical keyword including a numerical and a Pinyin keyword including an individual Pinyin character, the system 200 for searching for the Chinese character receives the search word via a first search page 203, recognizes the number as a tone mark of an individual Pinyin character, searches through retrieved results of the individual Pinyin character with respect to the tone mark, generates a retrieved result page 204, and transmits the retrieved result page 204 to the user terminal 201, thereby processing a request of the user terminal 201 for the search word.

Alternatively, when the search word is a Pinyin keyword 205 including an individual Pinyin character, the system 200 for searching for the Chinese character receives the retrieved result via a second search page 206, and generates an individual Pinyin retrieved result page 207. In this instance, the system 200 for searching for the Chinese character generates a tone mark result page 208, 209, 210, 211 with respect to each tone mark of the individual character, and establishes a link on the individual Pinyin retrieved result page 207, thereby processing a request of the user terminal 201.

As described above, a required search result may be obtained since the retrieved result of the tone mark is displayed through the searching for the Chinese character using the tone mark of the individual Pinyin character. The method for searching for the Chinese character using the tone mark will be described by referring to FIGS. 3 through 7.

Figure 3:
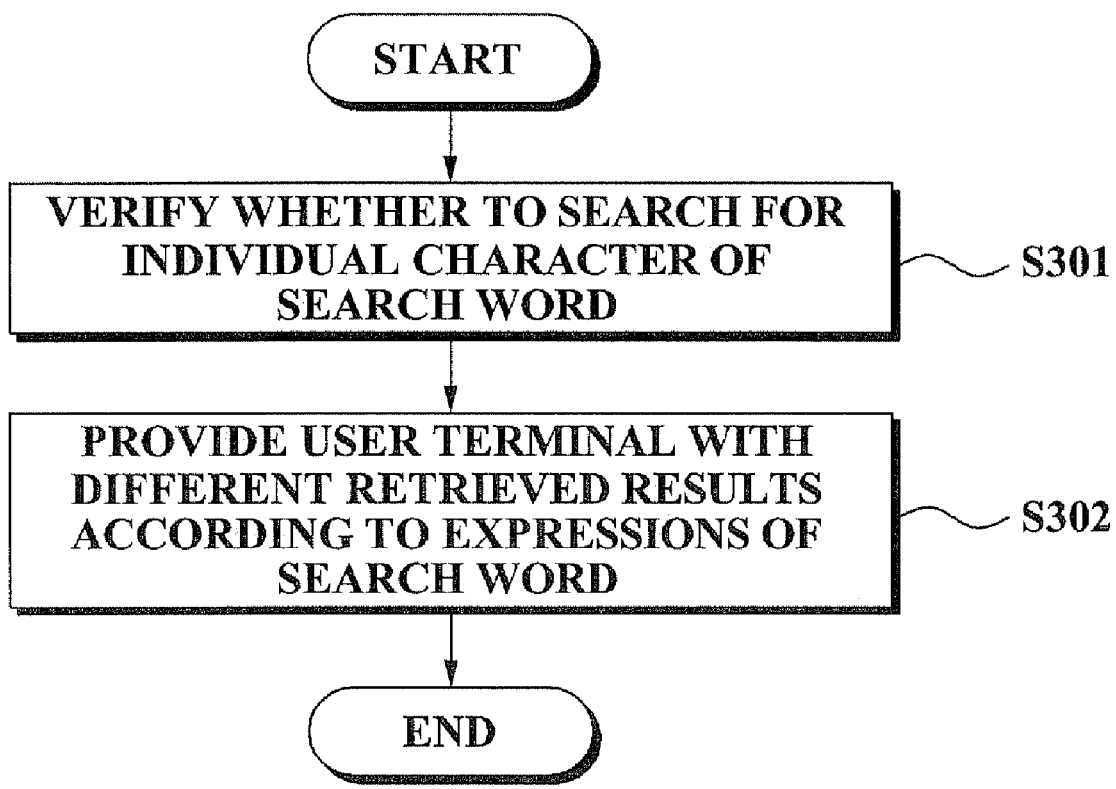
FIG. 3 is a flowchart illustrating a method for searching for a Chinese character according to the first embodiment of the present invention.

FIG. 3 is a flowchart illustrating a method for searching for a Chinese character according to the first embodiment of the present invention.

In operation S301, a system for searching for a Chinese character which displays a retrieved result with respect to the Chinese character verifies whether to search for an individual character of a search word being entered via a user terminal. In this instance, the step of the searching for the individual character may correspond to the following: 1) searching for an individual Pinyin character based on Pinyin Romanization or Wade-Giles Romanization; 2) searching for a single Korean syllable; and 3) searching for a single Chinese character. In operation S301, when a keyword, which consists of the individual character of Pinyin, the single Korean syllable, and the single Chinese character, is extracted after analyzing the search word, the system for searching 200 for the Chinese character verifies whether to search for the individual character of the search word.

In operation S302, the system for searching for the Chinese character provides the user terminal with different retrieved results depending on expressions of the search word, in the step of the searching for the individual character. The search word may exclusively include the individual Pinyin character, or may include a number indicating the individual Pinyin character and a tone mark of the individual Pinyin character. Also, the search word may include a keyword which consists of the single Korean syllable or the single Chinese character.

Namely, the system for searching for the Chinese character generates retrieved result pages which are different according to types and configurations of keywords included in the search word, and transmits the retrieved page of the Pinyin keyword with respect to the tone mark, thereby displaying a result of the step of the searching for the Chinese character. The displaying of different retrieved result pages in operation S302 will be described in detail by referring to FIGS. 4 through 7.

Also, in operation S302, the system for searching for the Chinese character, when the search word corresponds to a keyword including the single Korean syllable, may provide the user terminal with a result page which is retrieved using pronunciation of the single Korean syllable, generate a retrieved result page consisting of a retrieved result which corresponds to the keyword with respect to Jiantizi (Simplified Chinese) and Fantizi (Traditional Chinese), and may provide the user terminal with the generated retrieved result page.

Also, the system for searching for the Chinese character may perform further an operation (not shown) of generating a retrieved result page by using a Chinese language dictionary and a vernacular language dictionary with respect to the search word, and of providing the user terminal with the generated retrieved result page.

Figure 4:
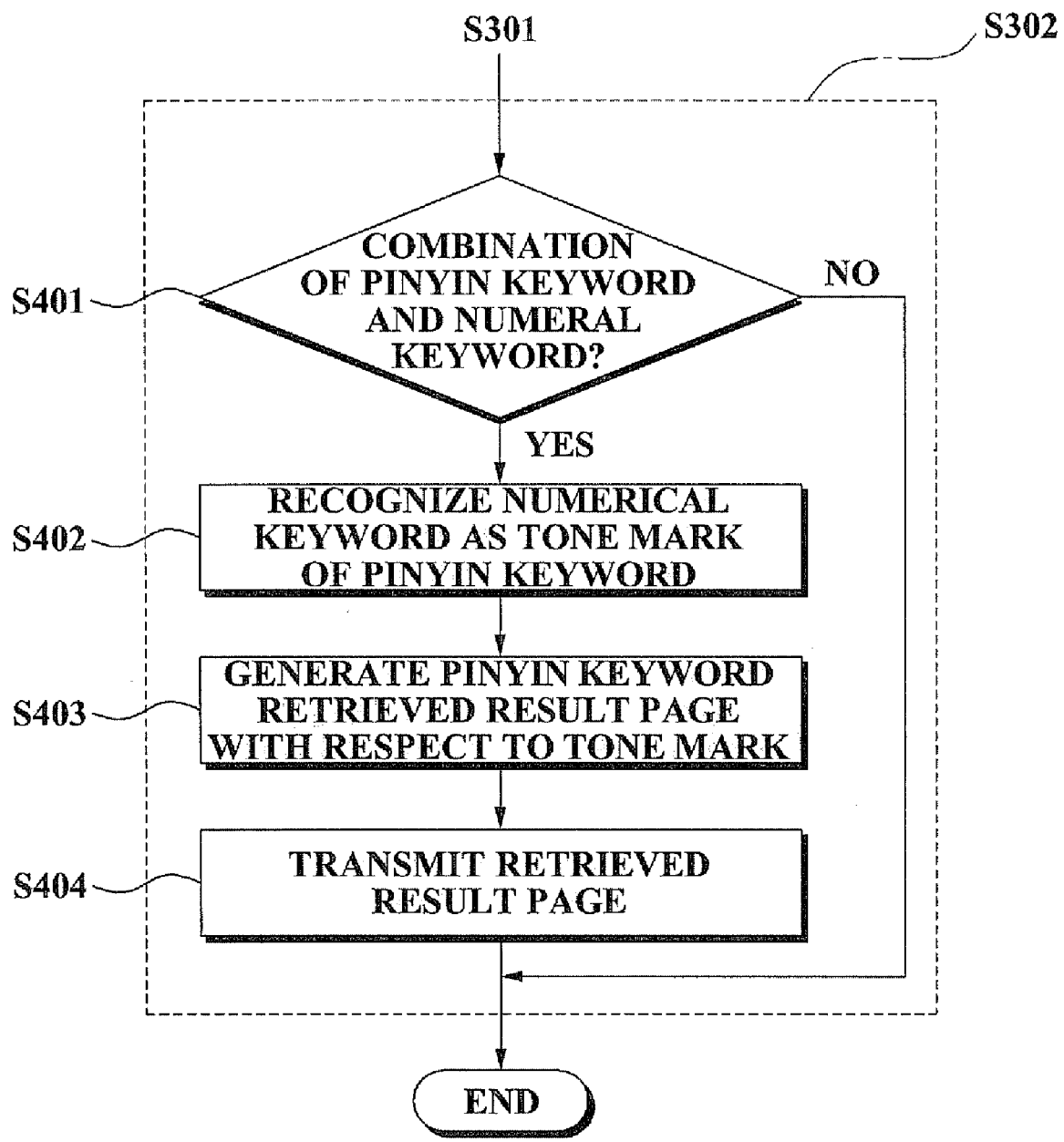
FIG. 4 is a flowchart illustrating a method for providing a retrieved result of a search word which includes a Pinyin keyword and a numerical keyword according to the first embodiment of the present invention.

FIG. 4 is a flowchart illustrating a method for providing a retrieved result of a search word which includes a Pinyin keyword and a numerical keyword according to the first embodiment of the present invention. As illustrated in FIG. 4, operations S401 through S404 may be included in operation S302 of FIG. 3 to be performed.

In operation S401, the system for searching for the Chinese character verifies whether a search word consists of a combination of a Pinyin keyword and a numerical keyword, performs operation S402 when the search word consists of the combination of the Pinyin keyword and the numerical keyword, and terminates operation S302 when the search word does not consist of the combination of the Pinyin keyword and the numerical keyword. In this instance, the system for searching for the Chinese character does not immediately terminate operation S420 when the search word does not consist of the combination of the Pinyin keyword and the numerical keyword, and may perform the searching for a keyword consisting of the single Korean syllable or the single Chinese character.

In operation S402, the system for searching for the Chinese character identifies the numerical keyword as a tone mark of the Pinyin keyword. The tone mark may indicate four tones of a first tone, a second tone, a third tone, and a fourth tone, which are used in Chinese, and respectively identifies numbers of one through four as the first, second, third, and fourth tones when the numerical keyword includes the numbers of one through four.

In operation S403, the system for searching for the Chinese character generates a retrieved result page of the Pinyin keyword with respect to the tone mark. In this instance, the Pinyin keyword may include an individual Pinyin character based on Pinyin Romanization or Wade-Giles Romanization. Also, the system for searching for the Chinese character generates a result page of each tone mark with respect to other tone marks, besides the tone mark entered by a user, and entire result pages on the retrieved result page, and establishes a link on the retrieved result page of the Pinyin keyword, thereby providing the user with additional information.

In operation S404, the system for searching for the Chinese character transmits the retrieved result page to the user terminal. As described above, since the retrieved result page includes a retrieved result associated with the tone mark, and thus the user may easily and quickly obtain a required retrieved result using the retrieved result of the tone mark without verifying all retrieved results corresponding to the four tones.

Figure 5:
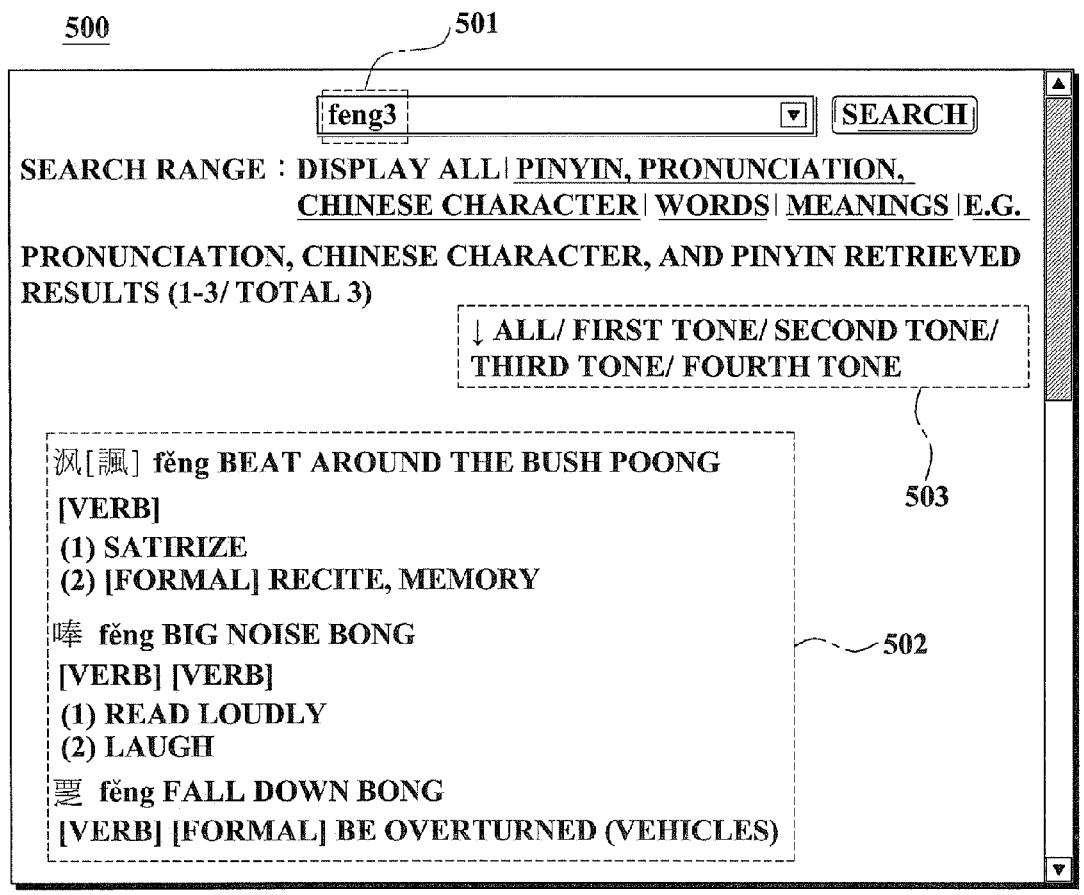
FIG. 5 is a diagram illustrating an example of a retrieved result page of a search word which includes a Pinyin keyword and a numerical keyword.

FIG. 5 is a diagram illustrating an example of a retrieved result page of a search word 501 which includes a Pinyin keyword and a numerical keyword.

A web page 500 is a part of an Internet page for searching through a Chinese dictionary, and displays a retrieved result page which is retrieved using the Chinese dictionary with respect to the search word 501 including a Pinyin keyword and a numerical keyword. In this instance, a system for searching for a Chinese character extracts a Pinyin keyword and a numerical keyword from the search word 501, identifies the numerical keyword as a tone mark of the Pinyin keyword, thereby generating the retrieved result page of the Pinyin keyword with respect to the tone mark.

The web page 500 is an example of the retrieved result page, and displays a retrieved result page of 'feng' with respect to a third tone by using a Pinyin keyword 'feng' and a numerical keyword 'three'. Also, the web page 500 may include a link 503 to a result page for each tone mark of the Pinyin keyword, thereby providing a function of being capable to easily search through a retrieved result of other tone marks when a user incorrectly inputs the tone mark.

Figure 6:
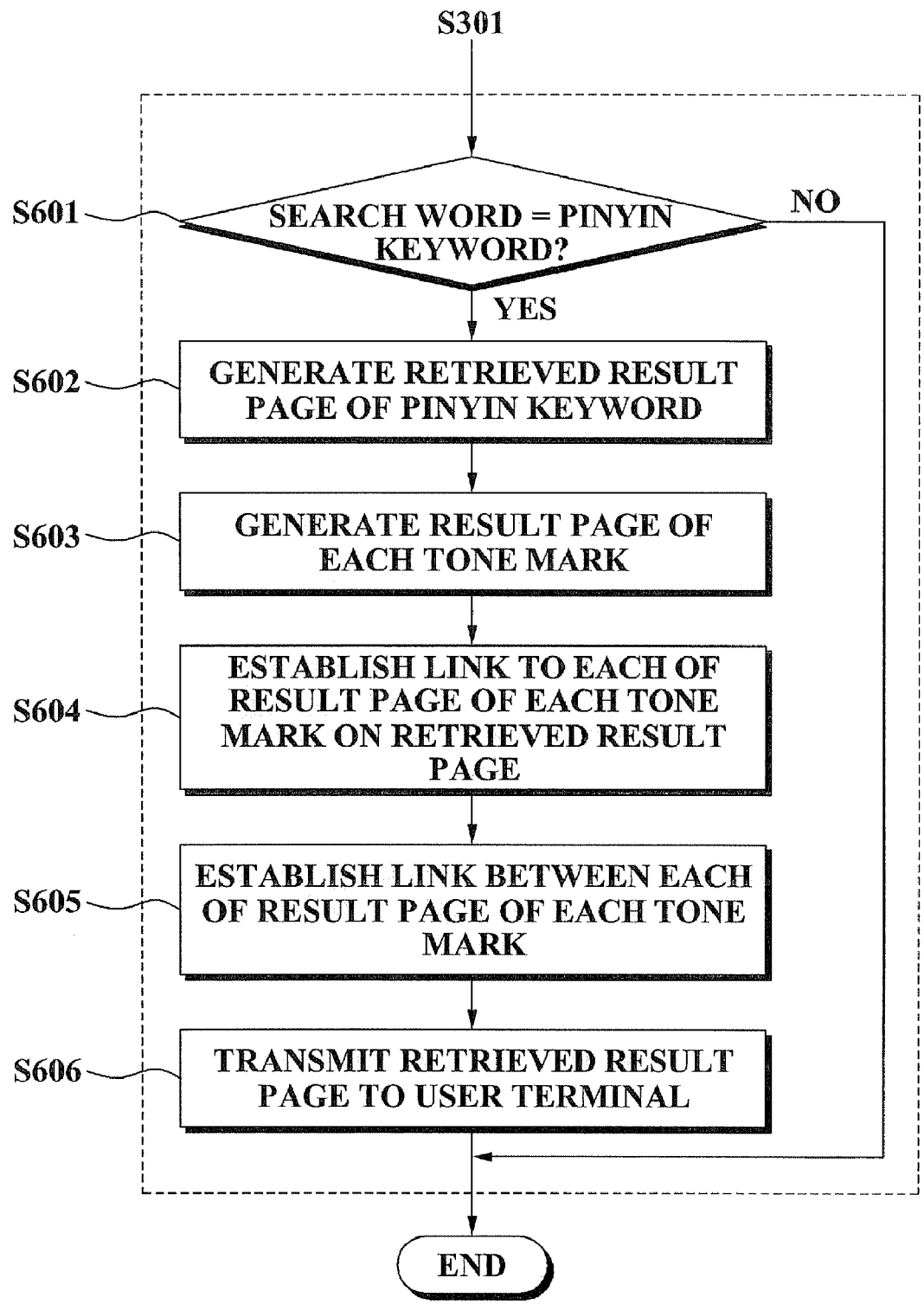
FIG. 6 is a flowchart illustrating a method for providing a search result of a search word including a Pinyin keyword according to the first embodiment of the present invention.

FIG. 6 is a flowchart illustrating a method for providing a retrieved result of a search word including a Pinyin keyword according to the first embodiment of the present invention. As illustrated in FIG. 6, operations S601 through S606 may be included in the operation S302 of FIG. 3 to be performed.

In operation S601, a system for searching for a Chinese character verifies the search word is the Pinyin keyword, performs operation S602 when the search word is the Pinyin keyword, and terminates operation S302 when the search word is not the Pinyin keyword. In this instance, as described from FIGS. 2 through 4, the system for searching for the Chinese character may perform searching for a keyword with respect to a combination of a Pinyin keyword and a numerical keyword, a single Korean syllable, and a single Chinese character when the search word is not the Pinyin keyword.

In operation S602, the system for searching for the Chinese character generates a retrieved result page of the Pinyin keyword. In this instance, the Pinyin keyword may include an individual Pinyin character based on Pinyin Romanization or Wade-Giles Romanization.

In operation S603, the system for searching for the Chinese character generates a result page of each tone mark as a result of the searching for the Pinyin keyword for each tone mark. The result page of each tone may include an individual retrieved result according to four tones of a first tone, a second tone, a third tone, and a fourth tone, which are used in Chinese.

In operation S604, the system for searching for the Chinese character establishes a link with respect to the each of the tone mark result page on the retrieved result page. That is, the system for searching for the Chinese character respectively establishes a link, on the result page, to a result page for the tone mark with respect to the first tone, a result page for the tone mark with respect to the second tone, a result page for the tone mark with respect to the third tone, and a result page for the tone mark with respect to the fourth tone, and when a user is aware of a tone mark of a character to search for in association with the Pinyin keyword, the user may quickly move to a webpage including a required retrieved result via the link, thereby easily and quickly obtaining the required retrieved result.

In operation S605, the system for searching for the Chinese character establishes a link between each of the retrieved result pages of each tone mark with respect to the four tones. That is, the system for searching for the Chinese character establishes a link between each of the result pages, between a result page for the tone mark with respect to the first tone and a result page for the tone mark with respect to the second tone, between a result page for the tone mark with respect to the third tone and a result page for the tone mark with respect to the fourth tone, and the like. The step of the establishment of the links may be used when the user wants to search for retrieved results of each tone mark, with respect to the first, second, and fourth tones, when the user does not find a required retrieved result.

In operation S606, the system for searching for the Chinese character transmits the retrieved result page, in which the link has been established, to the user terminal. The user may easily and quickly obtain a required retrieved result using the transmitted retrieved result page and the step of the establishment of the links.

FIG. 7 is a diagram illustrating a retrieved result page which is generated with respect to a search word including Pinyin keyword.

A web page 710 displays a part of a retrieved result page of 'feng' 711 which includes a Pinyin keyword according to a system for searching for a Chinese character. In this instance, the system for searching for the Chinese character extracts 'feng' 711 of the Pinyin keyword, and displays a retrieved result with respect to the Pinyin keyword 'feng' 711.

The web page 710 displays all retrieved results 712 with respect to the Pinyin keyword, that is, the web page 720 displays all retrieved results with respect to four tones. In this instance, the system for searching for the Chinese character generates a result page of each tone mark of the Pinyin keyword, and establishes a link to each of result pages of each tone mark of the Pinyin keyword on the web page 710. Therefore, the user may quickly move to a result page associated with the tone mark via the link when a user is aware of a tone mark of the Pinyin keyword to search for.

The web page 720 is a result page of each tone mark with respect to a third tone of the Pinyin keyword, and the user may quickly move to a web page 720 via links to the third tones 713 and 721, thereby finding a retrieved result 722 of the third tones 713 and 721.

As described above, a required search result may be easily and quickly obtained since a numerical keyword is recognized as a tone mark of a Pinyin keyword being included in a search word when the search word with respect to the Chinese character is entered, and a retrieved result with respect to the tone mark is exclusively disclosed as the retrieved result for the Pinyin keyword.

Also, the user may quickly obtain a required retrieved result with respect to a search word without the numerical keyword by providing the user with the link to the result page of each tone mark and the retrieved result of the Pinyin keyword included in the search word.

Figure 8:
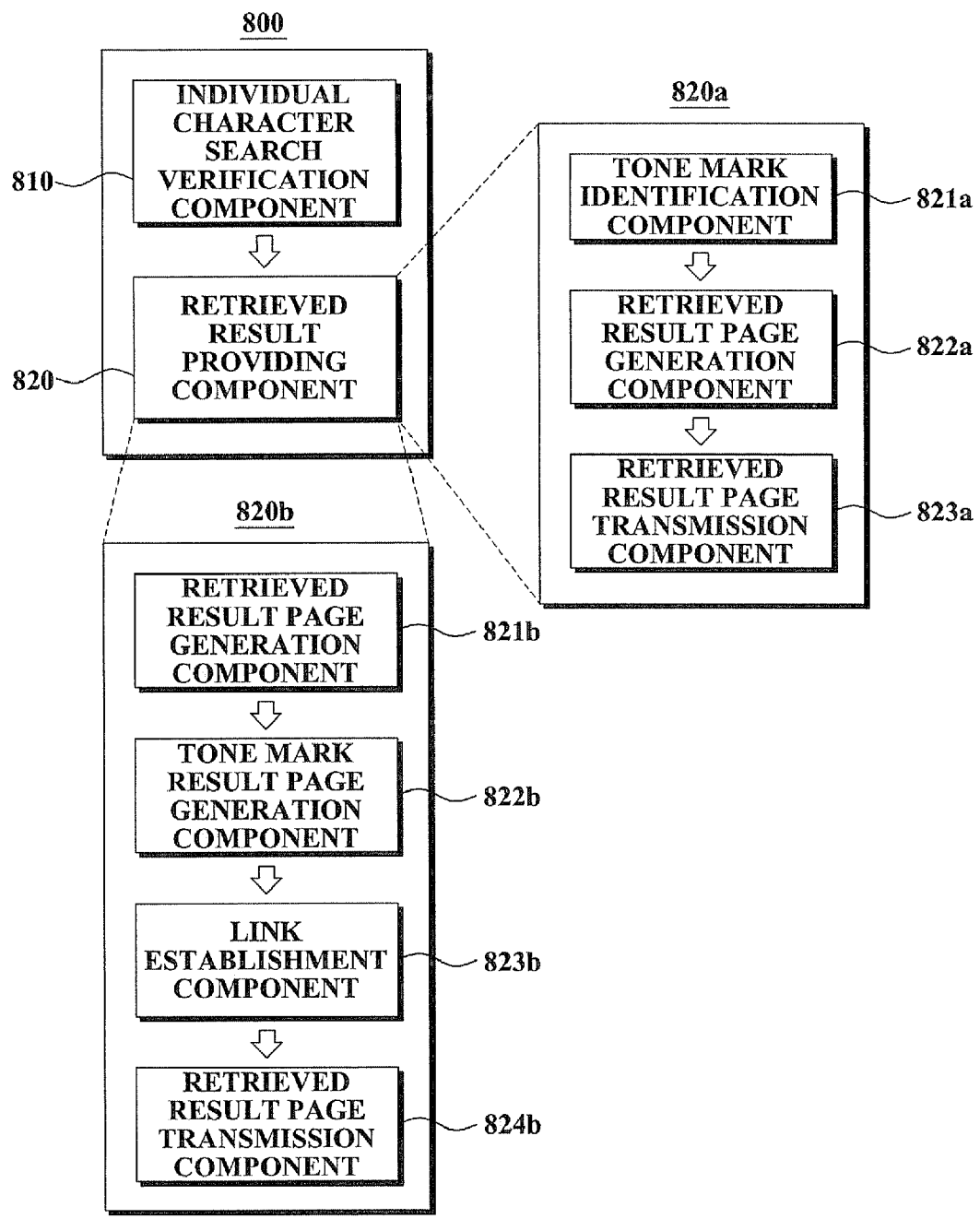
FIG. 8 is a block diagram illustrating an inner configuration of a system for searching for a Chinese character according to a second embodiment of the present invention.

FIG. 8 is a block diagram illustrating an inner configuration of a system 800 for searching for a Chinese character according to a second embodiment of the present invention. As illustrated in FIG. 8, the system 800 for searching for the Chinese character includes an individual character search verification component 810 and a retrieved result providing component 820.

The individual character search verification component 810 verifies whether to search for an individual character of a search word being entered via a user terminal. In this instance, the step of the searching for the individual character may correspond to the following: 1) searching for an individual Pinyin character based on Pinyin Romanization or Wade-Giles Romanization; 2) searching for a single Korean syllable; and 3) searching for a single Chinese character. The individual character search verification component 810 verifies whether to search for the individual character of the search word when a keyword is extracted after analyzing the search word, the keyword consisting of the individual character of Pinyin, the single Korean syllable, and the single Chinese character.

The retrieved result providing component 820 provides the user terminal with different retrieved results according to expressions of the search word, with respect to the step of the searching for the individual character. In this instance, as illustrated in 820a, the retrieved result providing component 820 may include a tone mark identification component 821a, a retrieved result page generation component 822a, and a retrieved result page transmission component 823a. Also, as illustrated in 820b, the retrieved result providing component 820 may include a retrieved result page generation component 821b, a tone mark result page generation component 822b, a link establishment component 823b, and a retrieved result page transmission component 824b.

The tone mark identification component 821a identifies a numerical keyword as a tone mark of a Pinyin keyword when the search word consists of a combination of the Pinyin keyword and the numerical keyword. In this instance, the tone mark may indicate four tones of a first, second, third, and fourth tones, which are used in Chinese, and respectively identifies numbers of one through four as the first, second, third, and fourth tones when the numerical keyword includes the numbers of one through four.

The retrieved result page generation component 822a generates a retrieved result page of the Pinyin keyword with respect to the tone mark. The Pinyin keyword may include an individual Pinyin character based on Pinyin Romanization or Wade-Giles Romanization.

The retrieved result page transmission component 823a transmits the retrieved result page to the user terminal.

As described above, according to the system for searching for the Chinese character of the present invention, a user may easily and quickly find a required retrieved result since the tone marks of individual Pinyin character being entered via a user terminal are simultaneously entered, and the required retrieved result is searched only from a retrieved result associated with the tone marks, not from entire retrieved results.

The retrieved result page generation component 821b retrieves a result page of the Pinyin keyword with respect to the tone mark when the search word is the Pinyin keyword. In this instance, the retrieved result page generation component 821b extracts a keyword of the search word, and is operated only when the keyword is the Pinyin keyword. That is, the retrieved result providing component 820 may operate the inner configuration of the system 820a by being limited to when the search word is the Pinyin keyword.

The tone mark result page generation component 822b generates a result page of each tone mark as a result of the searching for the Pinyin keyword for each tone mark.

The link establishment component 823b establishes a link to each result page for each tone mark on the retrieved result page. In this instance, the tone mark may indicate four tones used in Chinese characters, and the link establishment component 823b may establish the link between each result page for each tone mark.

The retrieved result page transmission component 824b transmits the retrieved result page, in which the link has been established, to the user terminal.

As described above, the user may quickly obtain a required retrieved result with respect to a search word without the numerical keyword by providing the user with the link to the result page of each tone mark and the retrieved result of the Pinyin keyword included in the search word.

Figure 9:
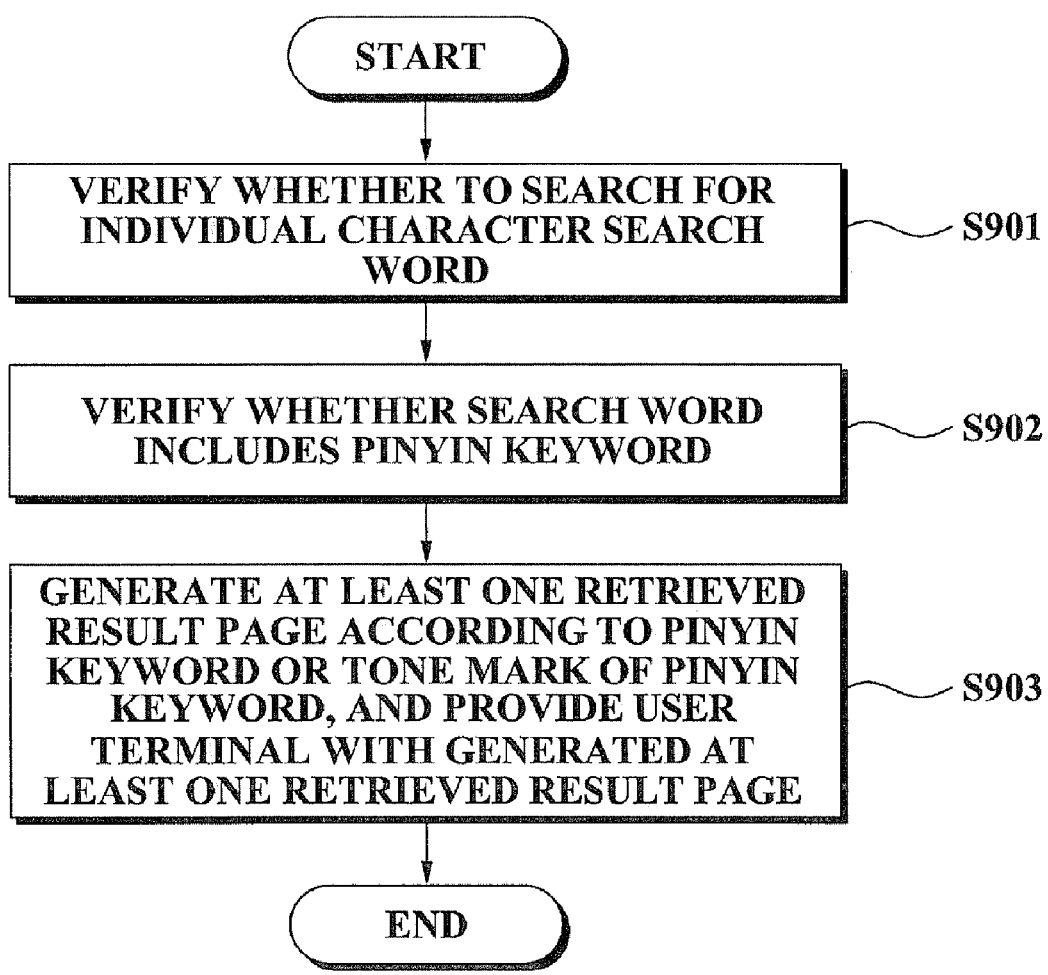
FIG. 9 is a flowchart illustrating a method for searching through a tonal language according to a third embodiment of the present invention.

FIG. 9 is a flowchart illustrating a method for searching for a character in a tonal language according to a third embodiment of the present invention.

In operation S901, the method for searching for the character in the tonal language verifies whether to search for an individual character of a search word being entered via a user terminal, the system for searching for the tonal language providing a retrieved result of the tonal language. In this instance, the searching for the individual character may include searching for the search word which includes an individual Pinyin character of the tonal language.

In operation S902, the method for searching for the character in the tonal language verifies whether a search word includes a Pinyin keyword in the searching for the individual Pinyin character. In this instance, the Pinyin keyword may include an individual character of a tonal language, which has different meanings depending on a tone mark. The tone mark includes a plurality of tone marks which are used for the tonal language. As an example, That has five tones, a flat tone, a low tone, a descending tone, a high tone, and a rising tone, and meanings of words change depending on the five tones in Thai. A 'maa' in the flat tone means 'come' [verb], a 'maa' in the low tone means 'horse' [noun], and a 'maa' in the high tone means 'dog' [noun].

In operation S903, the method for searching for the character in the tonal language generates at least one retrieved result page according to the Pinyin keyword or a tone mark of the Pinyin keyword, and provides the user terminal with the generated retrieved result page.

Operation S903 may include steps of identifying the numerical keyword as a tone mark of a Pinyin keyword when the search word consisting of a combination of the Pinyin keyword and the numerical keyword (not shown), generating a retrieved result page of the Pinyin keyword with respect to the tone mark (not shown), and transmitting the retrieved result page of the Pinyin keyword to the user terminal (not shown).

Also, the step of the identifying the numerical keyword as a tone mark of a Pinyin keyword when the search word consisting of a combination of the Pinyin keyword and the numerical keyword may correspond to identifying a tone mark, which corresponds to numbers included in the numerical keyword, as the tone mark of the Pinyin keyword. Specifically, numbers of one through five are respectively allocated to the flat, low, descending, high, and rising tones, and each of tone marks corresponding to each of the numbers may be identified as a tone mark of the Pinyin keyword.

Operation S903 may include steps of generating a retrieved result page of the Pinyin keyword, generating a result page of each tone mark as a result of the searching for the Pinyin keyword for each tone mark, establishing a link to the result page of each tone mark on the retrieved result page of the Pinyin keyword, and transmitting the retrieved result page of the Pinyin keyword, in which the link has been established, to the user terminal.

As described above, with respect to a character of all tonal languages in addition to a Chinese character, a retrieved result may be identified for each tone mark by using the numerical keyword using the link.

Figure 10:
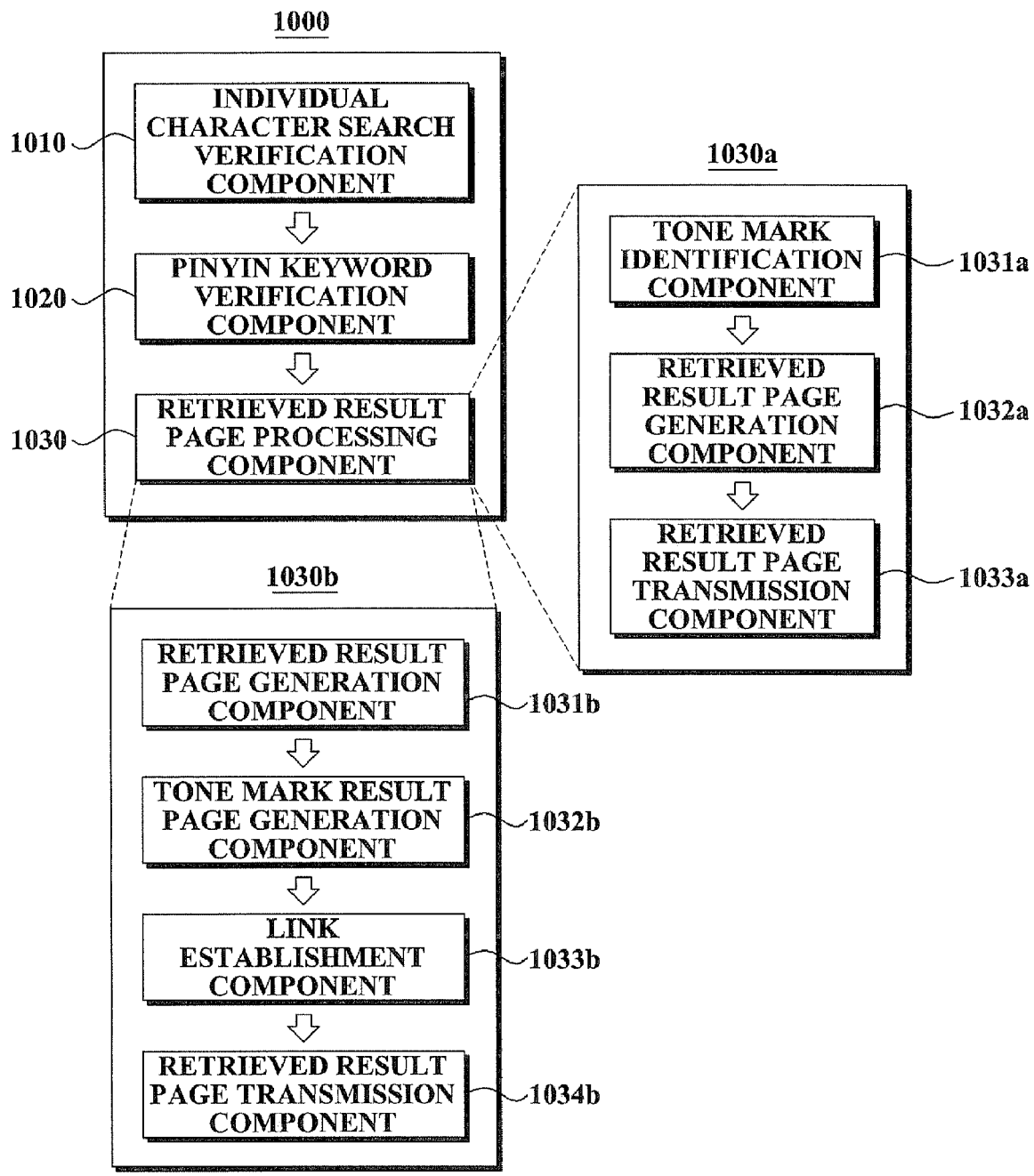
FIG. 10 is a block diagram illustrating an inner configuration of a system for searching through a tonal language according to a fourth embodiment of the present invention.

FIG. 10 is a block diagram illustrating an inner configuration of a system 1000 for searching for a character in a tonal language according to a fourth embodiment of the present invention. As illustrated in FIG. 10, the system 1000 for searching for the character in the tonal language may include an individual character search verification component 1010, a Pinyin keyword verification component 1020, and a retrieved result page processing component 1030.

The individual character search verification component 1010 verifies whether to search for an individual character of a search word being entered via a user terminal. In this instance, the step of the searching for the individual character may include searching for a search word which includes an individual Pinyin character of the tonal language.

The Pinyin keyword verification component 1020 verifies whether the search word includes the Pinyin keyword in the step of searching for the individual character. In this instance, the Pinyin keyword may include an individual character of a tonal language, which has different meanings depending on the tone mark, and the tone mark may include a plurality of tone marks used in the tonal language.

The retrieved result page processing component 1030 generates at least one retrieved result page according to the Pinyin keyword or a tone mark of the Pinyin keyword, and provides the user terminal with the generated at least one retrieved result page. In this instance, as illustrated in 1030a, the retrieved result page processing component 1030 may include a tone mark identification component 1031a, a retrieved result page generation component 1032a, and a retrieved result page transmission component 1033a.

The tone mark identification component 1031a identifies a numerical keyword as a tone mark of a Pinyin keyword when the search word consists of a combination of the Pinyin keyword and the numerical keyword. As an example, when the plurality of tone marks indicate a flat, low, descending, high, and rising tone used in That, the tone mark identification component 1031a may allocate numbers of one through five to each of the plurality of tone marks, and tones which correspond to the numbers may be identified as a tone mark of the Pinyin keyword.

The retrieved result page generation component 1032a generates a retrieved result page of the Pinyin keyword with respect to the tone mark.

The retrieved result page transmission component 1033a transmits the retrieved result page to the user terminal.

As described above, in the system for searching for the character of the tonal language, a user may easily and quickly find a required retrieved result since the plurality of tone marks of individual Pinyin character being entered via a user terminal are simultaneously entered, and the required retrieved result is searched only from a retrieved result associated with the tone marks, not from entire retrieved results.

A retrieved result page generation component 1031b generates a retrieved result page of the Pinyin keyword when the search word is the Pinyin keyword. In this instance, the retrieved result page processing component 1030 may operate an inner configuration of the system 1030b by being limited to when the search word is the Pinyin keyword.

A tone mark result page generation component 1032b generates a result page of each tone mark of the Pinyin keyword, that is, the result page of each tone mark of the Pinyin keyword.

A link establishment component 1033b establishes a link to the result page of each tone mark on the retrieved result page. As an example, when the tone mark indicate flat, low, descending, high, and rising tones used in That, the link establishment component 1033b may establish a link between the result page of each tone mark.

A retrieved result page transmission component 1034b transmits the retrieved result page of the Pinyin keyword, in which the link has been established, to the user terminal. As described above, the system 1000 for searching for the character in the tonal language, with respect to all tonal languages in addition to a Chinese character, a retrieved result may be identified for each tone mark by using the numerical keyword using the link.

The method for searching for a Chinese character according to the above-described embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, it is possible to easily and quickly obtain a required search result since a numerical keyword is recognized as a tone mark of a Pinyin keyword being included in a search word when the search word with respect to the Chinese character is entered, and a retrieved result with respect to the tone mark is exclusively disclosed as the retrieved result for the Pinyin keyword.

Also, according to the present invention, it is possible to easily and quickly obtain a required retrieved result since a retrieved result page for each tone mark is displayed along with a retrieved result of a Pinyin keyword included in the search word, with respect to a search word without a numerical keyword, and a link to a result page of each tone mark is additionally displayed along with the retrieved result of the Pinyin keyword.

Also, according to the present invention, it is possible to verify a retrieved result for each tone mark using a numerical keyword and a link in searching for a Pinyin character of all tonal languages, including Chinese.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a module. One or more components can reside within a process and/or thread of execution, and a module or component can be localized on one computer and/or distributed between two or more computers.

As used herein, the terms "desktop," "PC," "local computer," and the like, refer to computers on which systems (and methods) according to the invention operate. In the illustrated embodiments, these are personal computers, such as portable computers and desktop computers; however, in other embodiments, they may be other types of computing devices (e.g., workstations, mainframes, personal digital assistants or PDAs, music or MP3 players, and the like).

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that relative terms are intended to encompass different orientations of the device in addition to the orientation depicted in the Figures.

Moreover, it will be understood that although the terms first and second are used herein to describe various features, elements, regions, layers and/or sections, these features, elements, regions, layers and/or sections should not be limited by these terms. These terms are only used to distinguish one feature, element, region, layer or section from another feature, element, region, layer or section. Thus, a first feature, element, region, layer or section discussed below could be termed a second feature, element, region, layer or section, and similarly, a second without departing from the teachings of the present invention.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Further, as used herein the term "plurality" refers to at least two elements. Additionally, like numbers refer to like elements throughout.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims.

What is claimed is:

1. A method using a processor for searching for a Chinese character, the method comprising:
    receiving a search term associated with a search request, wherein the search term comprises at least one phonetic Chinese language, at least one other Chinese language, or a combination of the one phonetic Chinese language and the one other Chinese language;
    determining, by the processor, whether a numerical keyword being existed in the search term as a tone mark of a Pinyin keyword if the received search term comprises a combination of the Pinyin keyword and the numerical keyword;
    generating a search result by searching a Chinese character corresponding to the received search term according to the determined numerical keyword, and
    if the received search term comprises the Pinyin keyword without the numerical keyword, providing a link for specifying the search result, the link directing to the searched Chinese character and indicating at least one tone mark corresponding to the searched Chinese character.

2. The method of claim 1, wherein the at least one phonetic Chinese language comprises Pinyin.

3. The method of claim 1, wherein the at least one phonetic Chinese language comprises a vernacular language.

4. The method of claim 1, further comprising:
    searching at least one Chinese character associated with a vernacular syllable keyword in response to detection of the phonetic Chinese language being written in a vernacular language; and
    providing a search result comprising the searched Chinese character in response to the search request.

5. The method of claim 1, wherein the at least one other Chinese language comprises the Jiantizi (Simplified Chinese) or Fantizi (Traditional Chinese).

6. The method of claim 1, wherein the determining further comprises:
    extracting at least one keyword from the received search term; and
    analyzing the extracted keyword to determine a type of the received search term.

7. The method of claim 1, wherein the tone mark comprises four tones comprising a first tone, a second tone, a third tone, and a fourth tone, the four tones being used in Chinese, and the numerical keyword is provided to identify each of the four tones.

8. The method of claim 1, wherein the Pinyin keyword comprises an individual Pinyin character based on Pinyin Romanization or Wade-Giles Romanization.

9. The method of claim 1, further comprising:
    searching at least one Chinese character by using a Chinese language dictionary and a vernacular language dictionary with respect to at least a portion of the search term.

10. A non-transitory computer-readable storage medium comprising an executable program, which when executed, performs the method of claim 1.

11. A method using a processor for searching for a character in a tonal language, the method comprising:
    receiving a search term associated with a search request, wherein
    the search term comprises at least one phonetic Chinese language;

determining, by the processor, the received search term whether a phonetic keyword and a numerical keyword corresponding to the search term being existed as a tone mark of a Pinyin keyword if the received search term comprises a combination of the Pinyin keyword and the numerical keyword;

searching at least one Chinese character according to the determined phonetic keyword and the numerical keyword;

providing a search result comprising a dictionary definition of at least one Chinese character corresponding to at least one tone mark according to the determined numerical keyword; and if the received search term comprises the Pinyin keyword without the numerical keyword, providing a link for specifying the search result, the link directing to the searched at least one Chinese character and indicating at least one tone mark corresponding to the searched at least one Chinese character.

12. The method of claim 11, further comprising:

determining whether the search term comprises a combination of the Pinyin keyword and the numerical keyword which identifies the tone mark, wherein the numerical keyword represents each of the tone mark of the Pinyin keyword.

13. The method of claim 11, further comprising:

providing at least one link for specifying the search result, the link specifying at least one tone mark, wherein said link directing to the searched Chinese character and indicating at least one tone mark corresponding to the searched Chinese.

14. A non-transitory computer-readable storage medium comprising an executable program, which when executed, performs the method of claim 11.

15. A system using a server comprising a component for searching for a Chinese character, the system comprising:

an individual character search verification component, executed by a processor of the server, configured to determine a type of a search term associated with a search request based on at least a portion of said search term, wherein the type comprises at least one phonetic Chinese language, at least one other Chinese language, or a combination of the one phonetic Chinese language and the one other Chinese language; and a retrieved result providing component, executed by the processor of the server, configured to provide a search result based upon the type in response to the search request, wherein the search result comprises a dictionary definition of at least one Chinese character associated with the search term, wherein the retrieved result providing component further comprises a tone mark identification component, executed by the processor of the server, configured to identify a numerical keyword as a tone mark of a Pinyin keyword, wherein if the search term comprises a combination of the Pinyin keyword and the numerical keyword;

search component, executed by the processor of the server, configured to search at least one Chinese character associated with the Pinyin keyword and the tone mark thereof; and a retrieved result providing component, executed by the processor of the server, configured to provide a search result by searching the Chinese character corresponding to the search term according to the identified numerical keyword and the phonetic keyword, and if the search term comprises the Pinyin keyword without the numerical keyword, providing a link specifying the search result, the link indicating at least one tone mark corresponding to the searched Chinese character.

16. The system of claim 15, wherein the phonetic Chinese language comprises Pinyin.

17. The method of claim 15, wherein the phonetic Chinese language comprises a vernacular language.

18. A system using a server comprising a component for searching for a character in a tonal language, the system comprising:

an individual character search verification component, executed by a processor of the server, configured to determine whether to search for an individual character of a search word associated with a search request being entered via a terminal;

a Pinyin keyword verification component, executed by the processor of the server, configured to determine whether the search word comprises a Pinyin keyword associated with searching for the individual character; and a retrieved result page processing component, executed by the processor of the server, configured to generate at least one retrieved result page according to the Pinyin keyword or a tone mark of the Pinyin keyword, and to provide the user terminal with the generated at least one retrieved result page, wherein the retrieved result page processing component comprises a tone mark identification component, executed by the processor of the server, configured to determine a numerical keyword as a tone mark of the Pinyin keyword in response to detection of the search word corresponding to a combination of the Pinyin keyword and a numerical keyword if the search word comprises a combination of the Pinyin keyword and the numerical keyword;

a retrieved result page generation component, executed by the processor of the server, configured to generate a result page of the Pinyin keyword with respect to the tone mark; and a result page transmission component, executed by the processor of the server, configured to transmit the result page of the Pinyin keyword to the terminal by searching the search word according to the determined numerical keyword, and if the search term comprises the Pinyin keyword without the numerical keyword, to provide a link for specifying the search result, the link indicating at least one tone mark corresponding to the search word.

19. The system of claim 18, wherein the Pinyin keyword comprises an individual character of a tonal language, which comprises a different meaning depending on the tone mark, and the tone mark comprises a plurality of tone marks used for the tonal language.

* * * * *